US011501104B2

(12) United States Patent
Ung et al.

(10) Patent No.: US 11,501,104 B2
(45) Date of Patent: Nov. 15, 2022

(54) METHOD, APPARATUS, AND SYSTEM FOR PROVIDING IMAGE LABELING FOR CROSS VIEW ALIGNMENT

(71) Applicant: HERE GLOBAL B.V., Eindhoven (NL)

(72) Inventors: Alex Ung, San Francisco, CA (US); Zhanwei Chen, Richmond, CA (US); Anish Mittal, San Francisco, CA (US); Nicholas Pojman, San Francisco, CA (US); David Lawlor, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 16/201,527

(22) Filed: Nov. 27, 2018

(65) Prior Publication Data
US 2020/0167603 A1    May 28, 2020

(51) Int. Cl.
*G06F 3/048*     (2013.01)
*G06K 9/62*      (2022.01)
*G06T 7/73*      (2017.01)
*G06T 7/70*      (2017.01)
(Continued)

(52) U.S. Cl.
CPC ....... *G06K 9/6253* (2013.01); *G06F 3/04845* (2013.01); *G06K 9/6257* (2013.01);
(Continued)

(58) Field of Classification Search
CPC .. G06K 9/6253; G06K 9/6257; G06K 9/6202; G06K 2209/27; G06K 9/00664;
(Continued)

(56) References Cited

U.S. PATENT DOCUMENTS 9,196,086 B2 * 11/2015 Lynch ................. G06T 17/05
9,245,201 B1    1/2016 Jin et al.
(Continued)

FOREIGN PATENT DOCUMENTS

WO    2017165627 A1    9/2017

OTHER PUBLICATIONS

Jende et al., "Low-level Tie Feature Extraction of Mobile Mapping Data (mls/images) and Aerial Imagery", The International Archives of the Photogrammetry, Remote Sensing and Spatial Information Sciences, vol. XL-3/W4, 2016 EuroCOW 2016, the European Calibration and Orientation Workshop, Feb. 10-12, 2016, pp. 19-26.
(Continued)

*Primary Examiner* — Aleksey Olshannikov
*Assistant Examiner* — Alex Olshannikov
(74) *Attorney, Agent, or Firm* — Ditthavong, Steiner & Mlotkowski

(57) ABSTRACT

An approach is provided for image labeling for cross view alignment. The approach, for example, involves determining camera pose data, camera trajectory data, or a combination thereof for a first image depicting an area from a first perspective view. The approach also involves processing the camera pose data, the camera trajectory data, or a combination thereof to generate meta data indicating a position, an orientation, or a combination thereof of the first perspective view of the area relative to a second image depicting the area from a second perspective view. The approach further involves providing data for presenting the meta data in a user interface as an overlay on the second perspective view.

20 Claims, 13 Drawing Sheets

(51) Int. Cl.
*G06F 3/04845* (2022.01)
*G06T 7/20* (2017.01)
*G06T 11/60* (2006.01)
*G06V 10/75* (2022.01)

(52) U.S. Cl.
CPC .................. *G06T 7/20* (2013.01); *G06T 7/70* (2017.01); *G06T 7/73* (2017.01); *G06T 11/60* (2013.01); *G06V 10/751* (2022.01); *G06T 2200/24* (2013.01); *G06T 2207/10032* (2013.01); *G06T 2207/20081* (2013.01); *G06T 2207/30181* (2013.01); *G06T 2207/30241* (2013.01); *G06T 2207/30244* (2013.01); *G06V 2201/10* (2022.01)

(58) Field of Classification Search
CPC .. G06K 9/00791; G06K 9/0063; G06K 9/627; G06F 3/04845; G06T 7/70; G06T 7/73; G06T 11/60; G06T 7/20; G06T 2200/24; G06T 2207/20081; G06T 2207/30241; G06T 2207/30181; G06T 2207/30244; G06T 2207/10032
See application file for complete search history.

(56) References Cited

U.S. PATENT DOCUMENTS

| | | | |
|---|---|---|---|
| 10,169,680 B1 * | 1/2019 | Sachdeva | G05D 1/0221 |
| 2008/0221843 A1 | 9/2008 | Shenkar et al. | |
| 2010/0098342 A1 | 4/2010 | Davis et al. | |
| 2010/0299630 A1 * | 11/2010 | McCutchen | G06F 16/7844 715/803 |
| 2016/0005145 A1 * | 1/2016 | Seitz | G06T 3/0093 382/154 |
| 2017/0052035 A1 * | 2/2017 | Dorum | G01C 21/3667 |
| 2017/0148155 A1 | 5/2017 | Wei | |
| 2018/0188046 A1 * | 7/2018 | Akiva | G01C 21/32 |
| 2018/0283892 A1 | 10/2018 | Behrendt et al. | |
| 2019/0025853 A1 * | 1/2019 | Julian | G06K 9/00791 |
| 2019/0304134 A1 * | 10/2019 | Mauchly | G06N 3/08 |

OTHER PUBLICATIONS

Nguyen, "Optimal Ground Control Points for Geometric Correction Using Genetic Algorithm with Global Accuracy", published Feb. 17, 2017, European Journal of Remote Sensing—2015, 48: pp. 101-120.

Gao et al., "Automated Registration and Orthorectification Package for Landsat and Landsat-like Data Processing", Journal of Applied Remote Sensing, Mar. 1, 2009, vol. 3, Issue 1, 20 pages.

Office Action for related European Patent Application No. 19211442.9-1203, dated Mar. 9, 2020, 8 pages.

Office Action for related European Patent Application No. 19211442.9-1207, dated Jan. 15, 2021, 4 pages.

* cited by examiner

METHOD, APPARATUS, AND SYSTEM FOR PROVIDING IMAGE LABELING FOR CROSS VIEW ALIGNMENT

BACKGROUND

Modern location-based services and applications (e.g., autonomous driving) are increasingly demanding highly accurate and detailed digital map data (e.g., centimeter-level accuracy or better) across wide geographic areas. To achieve such levels of coverage, map service providers have relied on data (e.g., imagery) collected from a variety of sources with different views or perspectives (e.g., top down imagery from aerial cameras, and ground-level imagery for surface vehicles, etc.). Map service providers can then, for instance, identify common semantic features (e.g., lane markings, signs, etc.) across the image views for map making, localization, and/or other similar location-based services. However, identifying features and then relating them as the same feature across image views presents significant technical because of the amount of data that has to be processed due, for instance, to differences in the scales of the images across different image views.

SOME EXAMPLE EMBODIMENTS

Therefore, there is a need for an approach for providing image labeling for cross view alignment between images from different sources or perspectives (e.g., ground level versus top down imagery).

According to one embodiment, a computer-implemented method for labeling images for cross view alignment comprises determining camera pose data, camera trajectory data, or a combination thereof for a first image depicting an area from a first perspective view (e.g., ground level perspective). The method also comprises processing the camera pose data, the camera trajectory data, or a combination thereof to generate meta data indicating a position, an orientation, or a combination thereof of the first perspective view of the area relative to a second image depicting the area from a second perspective view (e.g., top down perspective). The method further comprises providing data for presenting the meta data in a user interface as an overlay on the second perspective view.

According to another embodiment, an apparatus for labeling images for cross view alignment comprises at least one processor, and at least one memory including computer program code for one or more computer programs, the at least one memory and the computer program code configured to, with the at least one processor, cause, at least in part, the apparatus to determine camera pose data, camera trajectory data, or a combination thereof for a first image depicting an area from a first perspective view (e.g., ground level perspective). The apparatus is also caused to process the camera pose data, the camera trajectory data, or a combination thereof to generate meta data indicating a position, an orientation, or a combination thereof of the first perspective view of the area relative to a second image depicting the area from a second perspective view (e.g., top down perspective). The apparatus is further caused to providing data for presenting the meta data in a user interface as an overlay on the second perspective view.

According to another embodiment, a non-transitory computer-readable storage medium for labeling images for cross view alignment carries one or more sequences of one or more instructions which, when executed by one or more processors, cause, at least in part, an apparatus to determine camera pose data, camera trajectory data, or a combination thereof for a first image depicting an area from a first perspective view (e.g., ground level perspective). The apparatus is also caused to process the camera pose data, the camera trajectory data, or a combination thereof to generate meta data indicating a position, an orientation, or a combination thereof of the first perspective view of the area relative to a second image depicting the area from a second perspective view (e.g., top down perspective). The apparatus is further caused to providing data for presenting the meta data in a user interface as an overlay on the second perspective view.

According to another embodiment, an apparatus for labeling images for cross view alignment comprises means for determining camera pose data, camera trajectory data, or a combination thereof for a first image depicting an area from a first perspective view (e.g., ground level perspective). The apparatus also comprises means for processing the camera pose data, the camera trajectory data, or a combination thereof to generate meta data indicating a position, an orientation, or a combination thereof of the first perspective view of the area relative to a second image depicting the area from a second perspective view (e.g., top down perspective). The apparatus further comprises means for providing data for presenting the meta data in a user interface as an overlay on the second perspective view.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for labeling of images for cross view alignment are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
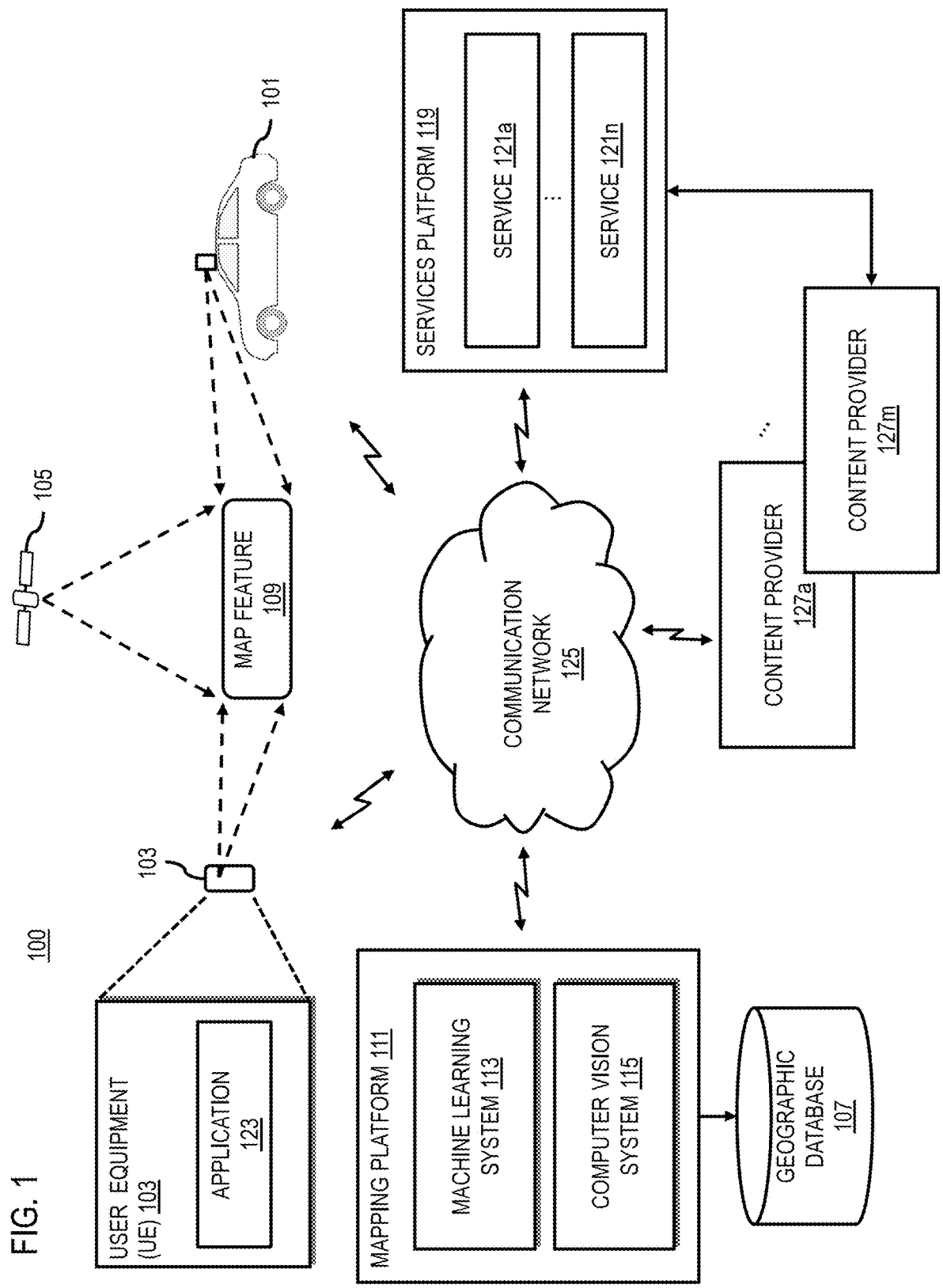
FIG. 1 is a diagram of a system capable of labeling images for cross view alignment, according to one embodiment.

FIG. 1 is a diagram of a system capable of generating feature correspondence between different images sources, according to one embodiment. As indicated above, many location-based services and applications rely on accurate map data. For example, automated driving is quickly becoming a reality following advances in machine learning, computer vision, and compute power. The ability to perceive the world with an accurate semantic understanding enables vehicles (e.g., an autonomous vehicle 101) to obey driving rules and avoid collisions. As these perceptual abilities have improved, so too has the need for highly accurate and up-to-date maps. Path planning, for instance, requires knowledge of what to expect beyond a vehicle 101's perceptual horizon, and driving in complicated urban environments with many occluding objects requires a knowledge of what cannot be detected by onboard sensors.

In response, map service providers (e.g., operating a mapping platform 111) are creating the most accurate and up-to-date high-resolution map. In addition to autonomous driving, digital maps in the form of models of the environment are needed for a wide range of automated applications including transportation, guidance, and search and rescue. Learning and automating the map creation and update has therefore been a major research focus in the robotics and artificial intelligence (AI) community in the last decades.

In one embodiment, to achieve a certain level of accuracy and freshness, different sources of raw data (e.g., image data) can be exploited to make a map. For example, top down sources, like satellite, aerial and drone images, which are accurate photographs of the Earth's surface from a top down perspective, can be used to precisely determine the location of roads, and other features (e.g., map feature 109) on the Earth. These images help create maps at a much larger scale but are more limited to surface features. Ground sources like cars and robots are also exploited to acquire an accurate model of their environment using sensing systems like cameras and running perception algorithms on the acquired data. Processing ground sources generally requires more effort and resources to do a larger scale city level collection, but the resulting images can be used to detect features (e.g., map feature 109) that are above the ground as well like traffic lights, signs etc. which may not be visible from a top down image or source.

In contrast, the geolocation of satellite imagery is pretty accurate and could be helpful in locating ground control points that are visible from both top down and ground level imagery (i.e., frontal or perspective imagery). These points could be used for calibration and shifting the GPS tracks associated with dash camera ground level imagery. However, remote sensing imagery (e.g., top down imagery) is collected only several times a year for a certain area and hence lacks the freshness needed to update the digital map. Accordingly, each source of imagery has its own benefits and leveraging them together provides great benefits.

Therefore, mapping a more complete set of features in an area may often require using complimentary kinds of data like dash cam imagery from ground vehicles and satellite/aerial imagery from remote sensing. There are several advantages, for example, in downtown areas where the satellite visibility is low, ground level imagery can be collected but the GPS location could be off by a few meters due to multipath interference from high buildings (e.g., urban canyons). Hence, the ground level image data associated with it will also be off. In addition, when map features are derived from this imagery, the mapping results will also have poor accuracy. However, the frequency with which ground level imagery could be collected and/or crowd sourced is high.

Since both top down and ground level imagery are georeferenced (e.g., have camera positions associated with them), the map features detected from the imagery will also have associated 3D positions and hence can be utilized for the map making process. In one embodiment, feature correspondences across different sources enables aggregating maps made from different sources for better accuracy and more completeness. They could also help with the correction of one source using the other, depending on the relative correctness of the sources.

However, determining feature correspondences between different images sources can be technically challenging. For example, with respect to determining feature correspondence between a top down image source (e.g., top down imagery from a satellite 105 or any other aerial source) versus ground level imagery from ground level sources (e.g., a vehicle 101, robot, or other ground level devices such as user equipment (UE) 103, there are least several technical challenges. For example, the common features (e.g., tie points) selected for determined feature correspondence should meet the following criteria:

(1) Should be visible from both top down and ground level views;
(2) Should not change very frequently; and
(3) Should be uniquely identifiable from their surroundings.

In addition, since the top down images could span hundreds of square kilometers with thousands of drives (amounting to millions of image captures at ground level) to cover the roads, the amount of data to be processed demands more efficient ways to generate these correspondences. This problem is particularly acute in embodiments where the feature correspondences are determined by human labelers who inspect the images to identify tie points (e.g., photo identifiable features, ground control points, etc.) that can be used to determine feature correspondences. It can be a very challenging task for a human labeler to mark (e.g., via a user interface of a device such UE 103 or other client terminal) to mark the same feature across different image views or perspectives. In particular, it can very difficult to locate where the labeler is in the top imagery while looking at the same area in ground level imagery (or vice versa).

Figure 2:
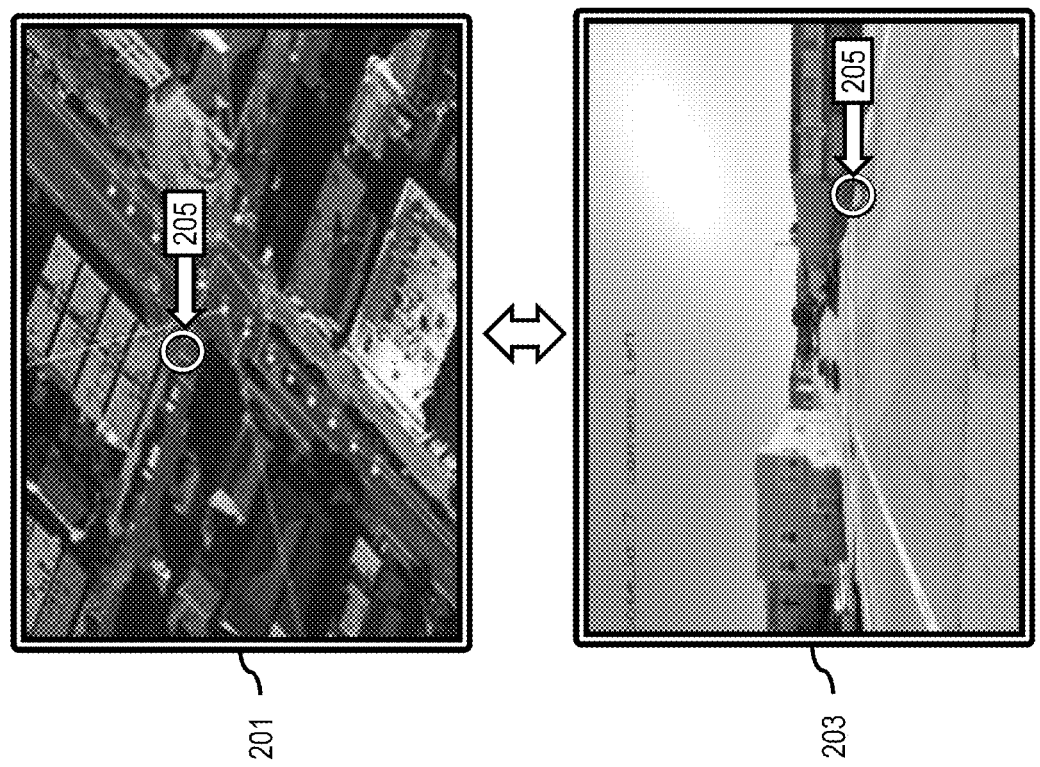
FIG. 2 is diagram illustrating a cross view alignment problem, according to one embodiment.

FIG. 2 illustrates an example top down image 201 and a corresponding ground level image 203 depicting a feature 205 (e.g., an intersection) of the same area. In the example of FIG. 2, it can be seen that it can be difficult for the labeler to understand which of the four intersection corners that is visible in the top down image 201 is the same feature 205 in the ground level image, which shows two possible intersection corners of the same intersection shown in the top down image 201. In this case, the labeler would have difficulty determining the orientation of the ground level image 203 with respect to the same area depicted in the top image 201 because the intersection looks similar from different perspectives. Both accuracy and time to label can have a big negative impact because of this issue. Users or labelers need to spend more time looking at other contexts (e.g., relative locations, viewing perspectives, etc.) to find the correct correspondences and even then, sometimes there just is not enough information available to make the correct correlation or labeling of the feature 205 across the top image 201 and ground level image 203. For example, a user or labeler would have to look at both top down and ground imagery and determine the orientations of both, while marking points that are identical in either image. This is a challenging task because the user must amass both kinds of images, orient herself/himself to understand the direction of the ground imagery relative to the top down imagery, and then find identical points in both images which the user can mark using photo editing tools. This difficulty can lead to increased error in feature labeling and correspondences, and in turn to increased error in the resulting digital map data.

Accordingly, service providers face significant technical challenges to facilitating feature identification across images with different perspective views.

To address these technical challenges and problems, the system 100 of FIG. 1 introduces a capability to view multiple images depicting a geographic area from different perspective views, and then provide a user (e.g., feature labeler) with contextual data on each image relative to one another, thereby allowing the user to create correspondence points (e.g., by identifying the same feature 109 visible in each image for feature correspondence). For example, the system 100 can overlay meta data associated with perspective images on top down imagery to enable labelers to perform feature correspondences across views with greater ease and accuracy. Such meta data includes but is not limited the tracks of ground vehicle with position and orientation information on the top down image. As another example, the system 100 can provide dynamic highlighting of the perspective image position on the top down image as the corresponding perspective image is selected for labeling. In other words, the system 100 can extract positional information from imagery of an area from a first perspective (e.g., ground level perspective) and then use the positional information to generate data for rendering cues to correlate the first perspective or image to another image of the same area taken from a second perspective (e.g., top down), or vice versa. In one embodiment, the system 100 can dynamically generate the cues based on what images or portion on an image is selected or viewed by the user for labeling.

Figure 3:
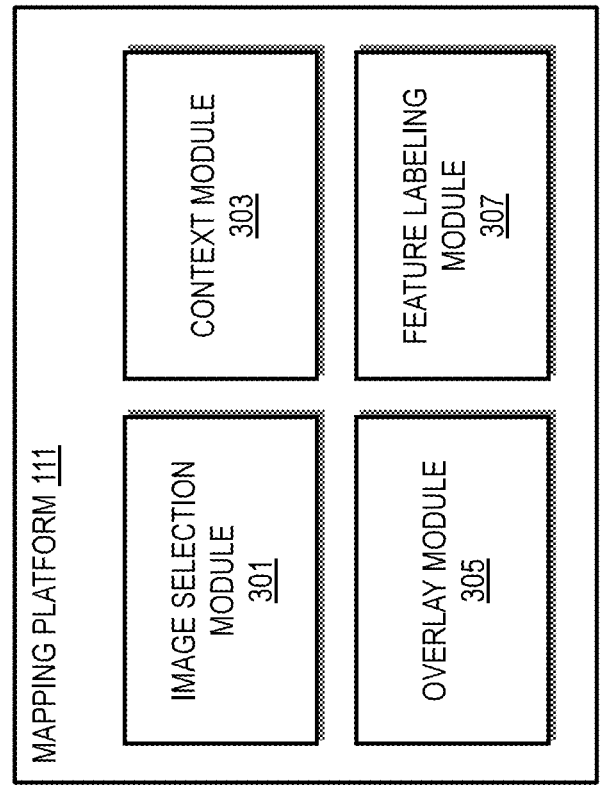
FIG. 3 is a diagram of components of a mapping platform capable of labeling images for cross view alignment, according to one embodiment.

In one embodiment, as shown in FIG. 3, the mapping platform 111 includes one or more components for generating feature correspondence between image sources, according to the various embodiments described herein. It is contemplated that the functions of these components may be combined or performed by other components of equivalent functionality. In this embodiment, the mapping platform 111 includes an image selection module 301, a context module 303, overlay module 305, and a feature labeling module 307. The above presented modules and components of the mapping platform 111 can be implemented in hardware, firmware, software, or a combination thereof. Though as a separate entity in FIG. 1, it is contemplated that the mapping platform 111 may be implemented as a module of any other component of the system 100 (e.g., a component of the services platform 119, services 121*a*-121*n* (also collectively referred to as services 121), vehicle 101, UE 103, application 123 executing on the UE 103, etc.). In another embodiment, one or more of the modules 301-307 may be implemented as a cloud based service, local service, native application, or combination thereof. The functions of the mapping platform 111 and the modules 301-307 are discussed with respect to FIGS. 4-6D below.

Figure 4:
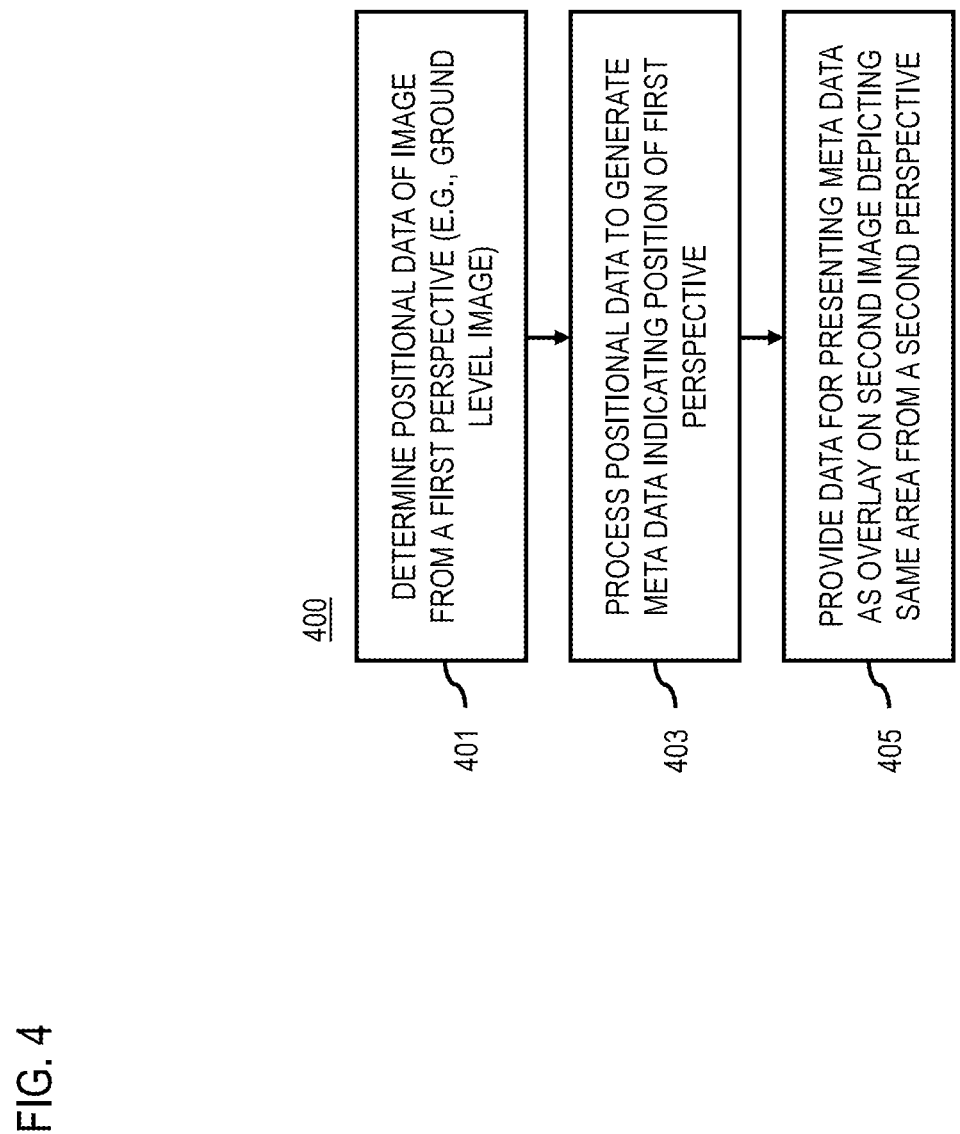
FIG. 4 is a flowchart of a process for labeling images for cross view alignment, according to one embodiment.
Figure 9:
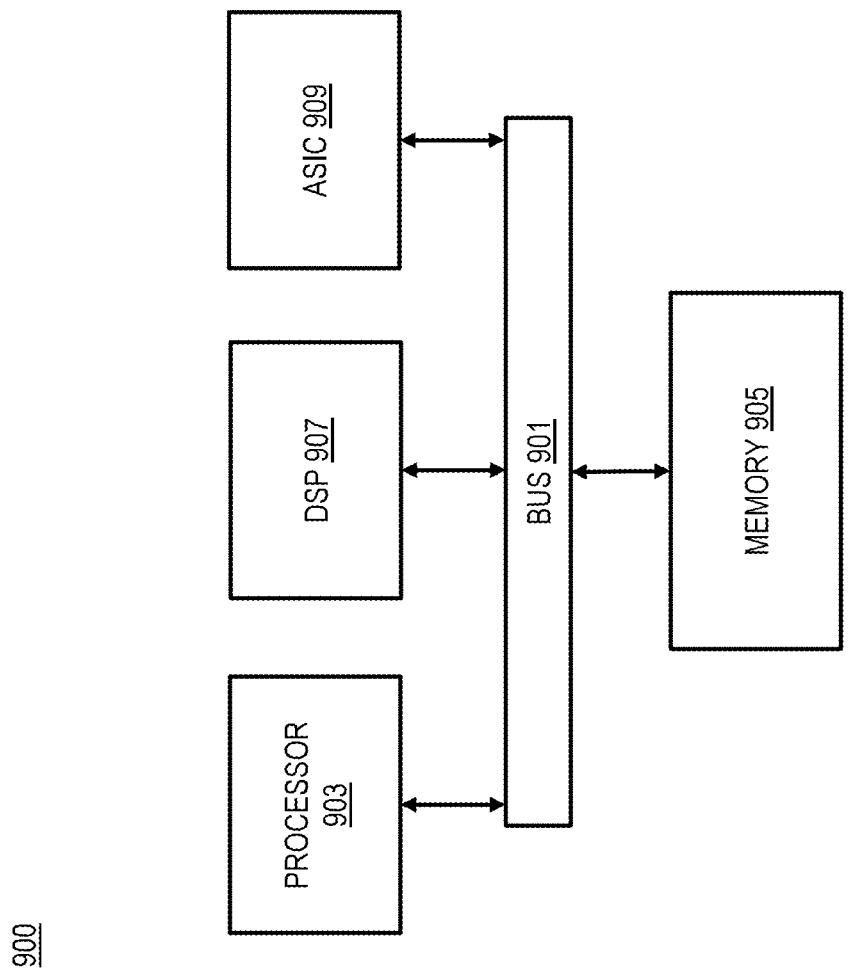
FIG. 9 is a diagram of a chip set that can be used to implement an embodiment.

FIG. 4 is a flowchart of a process for labeling images for cross view alignment, according to one embodiment. In various embodiments, the mapping platform 111 and/or any of the modules 301-307 of the mapping platform 111 may perform one or more portions of the process 400 and may be implemented in, for instance, a chip set including a processor and a memory as shown in FIG. 9. As such, the mapping platform 111 and/or the modules 301-307 can provide means for accomplishing various parts of the process 400, as well as means for accomplishing embodiments of other processes described herein in conjunction with other components of the system 100. Although the process 400 is illustrated and described as a sequence of steps, its contemplated that various embodiments of the process 400 may be performed in any order or combination and need not include all of the illustrated steps.

As discussed above, in one embodiment, the mapping platform 111 can use the process 400 as part of a feature labeling and correspondence process to automatically generate and present cues for correlating the position of different perspective images relative to each other. This can be important, for instance, when a user or labeler is attempting the label the same feature in two or more different images, particularly when the there are other similar looking features or when the locations or orientation of the perspective views are difficult to detect visually (e.g., when an area has similar looking features in all directions). In the general, the feature correspondence process of which the process 400 can (but not necessarily) be a part of attempts to find common semantic features that are visible in images from different sources or perspective views (e.g., top down imagery and ground level imagery).

Figure 5:
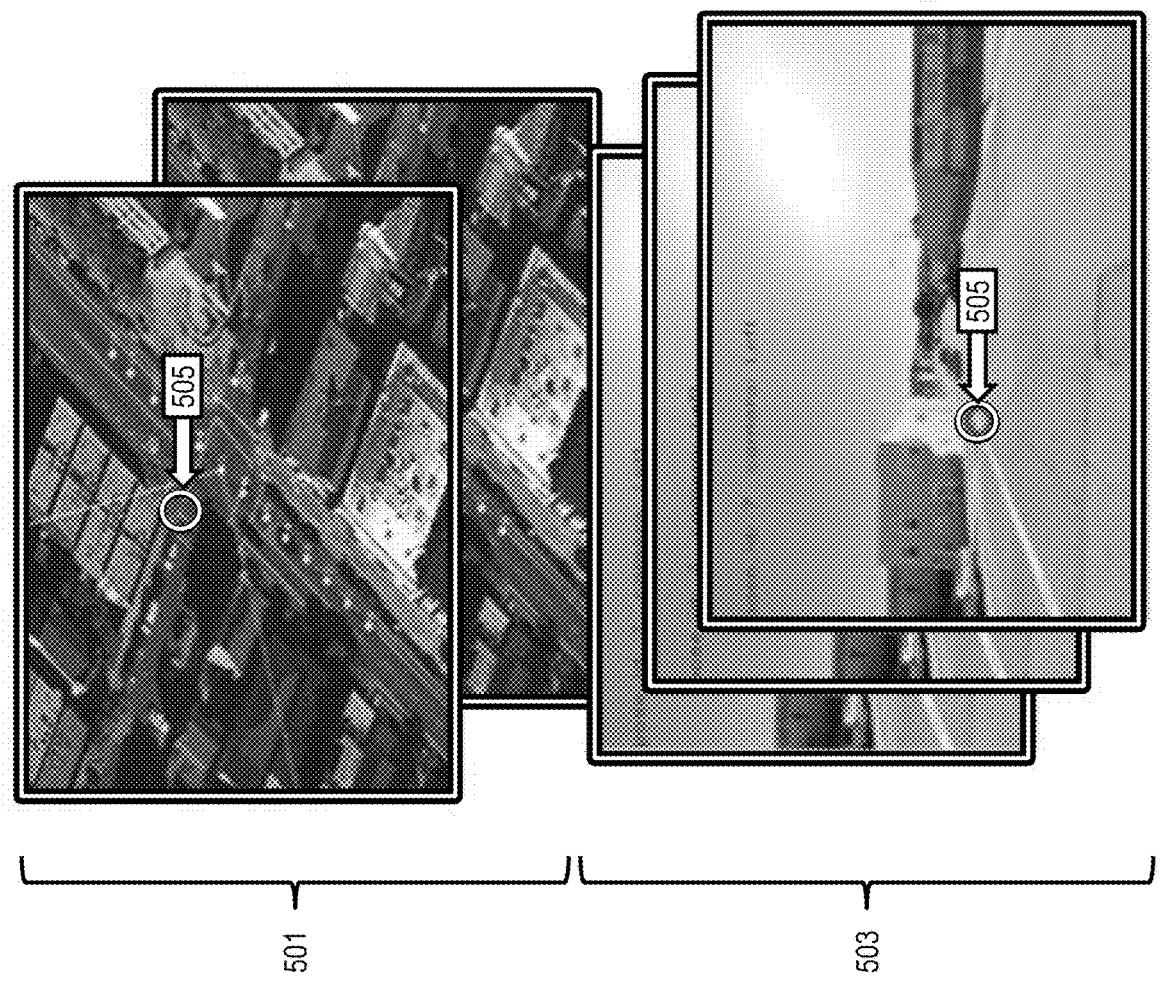
FIG. 5 is a diagram illustrating example image data from different sources depicting the same feature for cross view alignment, according to one embodiment.

FIG. 5 illustrates examples of a set of top down images 501 from a first source (e.g., an aerial or top source such as a satellite 105) and a set of ground level images 503 from a second source (e.g., a ground level source such as a camera mounted on a vehicle 101, UE 103, robot, or other system traveling on the ground). In this example, the top down images 501 and ground level images 503 depict the same map or semantic feature 505 (e.g., a crosswalk corner formed by the joining of two lines of a crosswalk painted in an intersection). By way of example, top-down imagery refers to images or image data that are captured from an overhead or aerial perspective so that the camera is pointed down towards the intersection or ground level from an overhead height. Ground-level imagery refers to images or image data captured while the camera is located at ground level or mounted on a vehicle or system that is located at ground level with the camera pointed towards the feature or object being captured. The top-down images 501 and ground level images 503 can be collected and then presented in a user interface, e.g., on a client device (e.g., UE 103 or other client terminal) for feature labeling by an end user.

In one embodiment, the process 400 can be used in combination with the presentation of a feature labeling user interface for cross view alignment between different image sources. The feature labeling, for instance, can be used for direct determination of feature correspondences, generating training data for training a machine learning system to determine feature correspondences, perform automated cross view alignment of images, and/or any other application or use case in which cross view alignment between different image perspectives is needed. Accordingly, the image selection module 301 can be used to aggregate a set or plurality of images with different image perspective views that show a geographic area of interest. For example, the image selection module 301 can perform a location-based search of a database of imagery data to retrieve images that are to be processed according to embodiments of the process 400.

After selecting the images of interest, in step 401, the context module 303 determines positional data for a first image depicting an area from a first perspective view. In one embodiment, positional data refers to any data that can indicate a location, pointing direction, field of view, etc. of the image or any features depicted in the image. For example, positional data can include camera pose data, camera trajectory data, or a combination thereof. Camera pose data includes data including but not limited to any combination of: (1) a camera location— e.g., geo-coordinates of the camera or other sensor capturing the image as sensed by an onboard location sensor or location sensor associated with the vehicle 101, UE 103, and/or other component on which the camera or sensor is mounted; and (2) pointing/mounting direction of the camera or sensor— e.g., pointing direction with respect to the vehicle 101, UE 103, and/or other component on which the camera or sensor is mounted. Camera trajectory data refers to date indicating the path that the camera traveled along the ground. In one embodiment, the camera trajectory is determined from the trajectory of the vehicle 101, UE 103, etc. on which the camera or sensor is mounted. The trajectory data can be collected as a time-ordered sequence of location points (e.g., latitude, longitude, elevation) sensed by one or more location sensors of the vehicle 101, UE 103, etc.

In step 403, the context module 303 processes the positional data (e.g., the camera pose data, the camera trajectory data, or a combination thereof) to generate meta data indicating a position, an orientation, or a combination thereof of the first perspective view of the area relative to a second image depicting the area from a second perspective view. In one embodiment, the first image is a ground level image collected from a ground-based camera sensor, and the second image is a top down image collected from an aerial-based camera sensor; or vice versa. The context module 303, for instance, determines the area covered or depicted in the second image (e.g., a top down image) based on the respective camera pose data of the second image. For example, the camera pose data for top down imagery can include the location (e.g., latitude, longitude, elevation) of the camera or aerial platform (e.g., satellite 105) and also its camera's pointing direction, field of view, lens characteristics such as focal length, etc. In one embodiment, the camera pose data can then be used to translate pixel coordinates of both of the images with different perspective views to real-world geo-coordinates (e.g., via feature georeferencing, feature triangulation across multiple top images, etc.), so that perspectives depicted in each of the two images can be determined relative to each other. In one embodiment, the generated meta data includes any data that indicates the relative spatial relationship between the two images depicting the same geographic area or features of interest.

In step 405, the overlay module 305 provides data for presenting the meta data in a user interface as an overlay on the second perspective view. For example, the meta data can include data for generating a representation of the camera pose data, the trajectory data, or a combination thereof of either of the two perspective views as an overlay in a user interface displaying the other corresponding image. As discussed above, such meta data includes any data that can convey the orientation, position, etc. of one perspective view relative to a different perspective view of the same area or feature. As shown FIG. 6A, one example of such meta data that can be overlaid on a top down image 601 includes but is not limited to a vehicle trajectory 603 that shows the tracks of a ground vehicle 101 with the vehicle trajectory 603 comprising four locations 605a-605d at which the ground vehicle 101 captured respective images 607a-607d.

In this example, the overlay represents the locations 605a-605d as rectangles with a corresponding triangle to represent the field of view and pointing direction of the camera at each location 605a-605d. In other words, when there are a plurality of images from one perspective (e.g., ground level perspective images) depicting the same area as an image from another perspective (e.g., top level image), the overlay module 305 can render representations of respective locations, respective camera poses, and/or trajectories of the plurality of images in the overlay on the image from the other perspective. In this way, a user viewing the overlay can quickly ascertain the spatial relationship between the locations 605a-605d in the top down image 601 with the corresponding ground level image 607a-607d captured at each location 605a-605d. This meta data can advantageously enable the user to identify and label common features across the top down image 601 and ground level images 607a-607d to determine features correspondences (e.g., for digital map making, vehicle/device localization, etc.). In other words, the user interface with the overlaid meta data can be used to receive a user interaction input for labeling a feature visible in the first image and the second image to determine a feature correspondence between the first and second images.

Figure 6A:
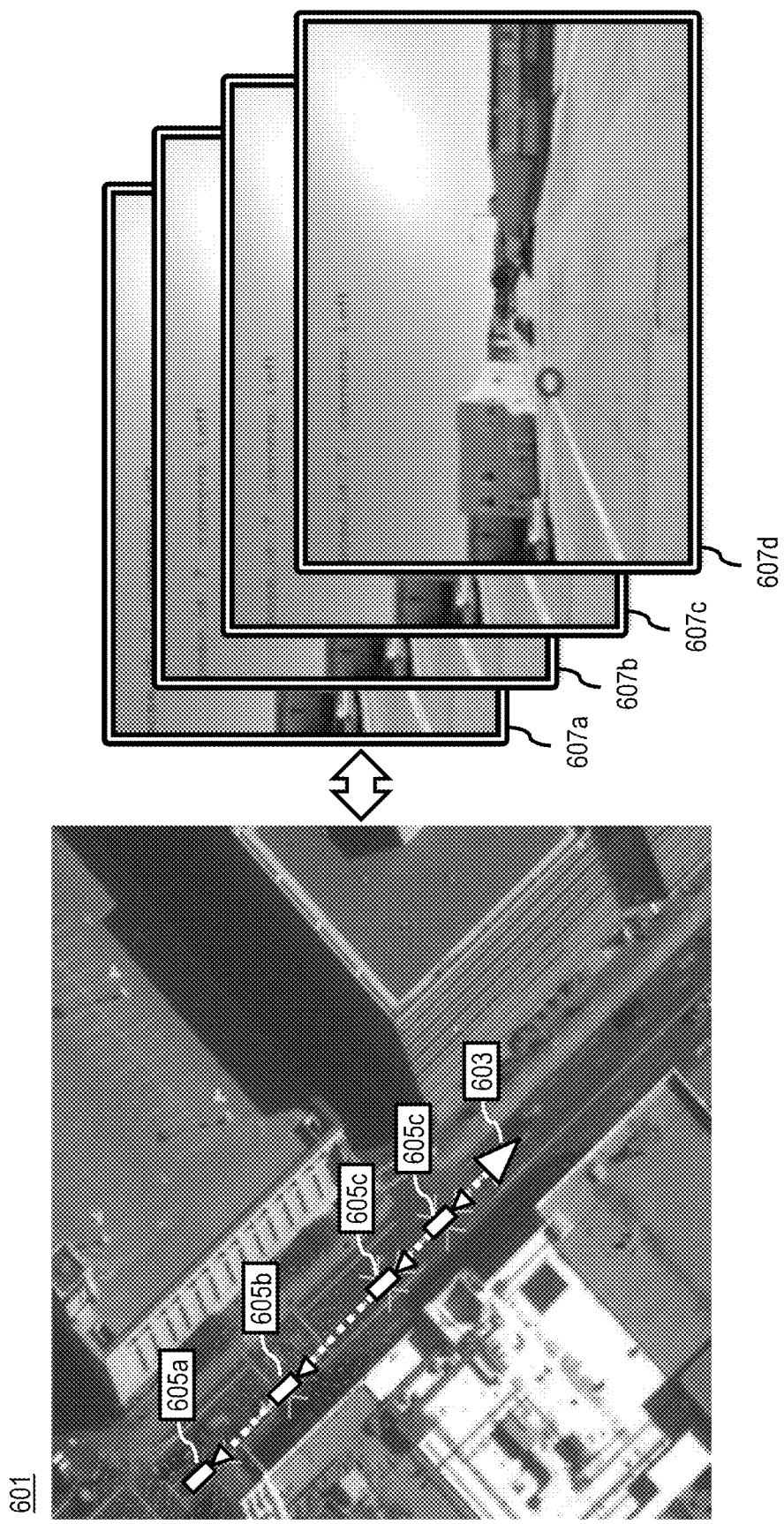
FIGS. 6A-6D are diagrams illustrating example user interfaces generated
Figure 6B:
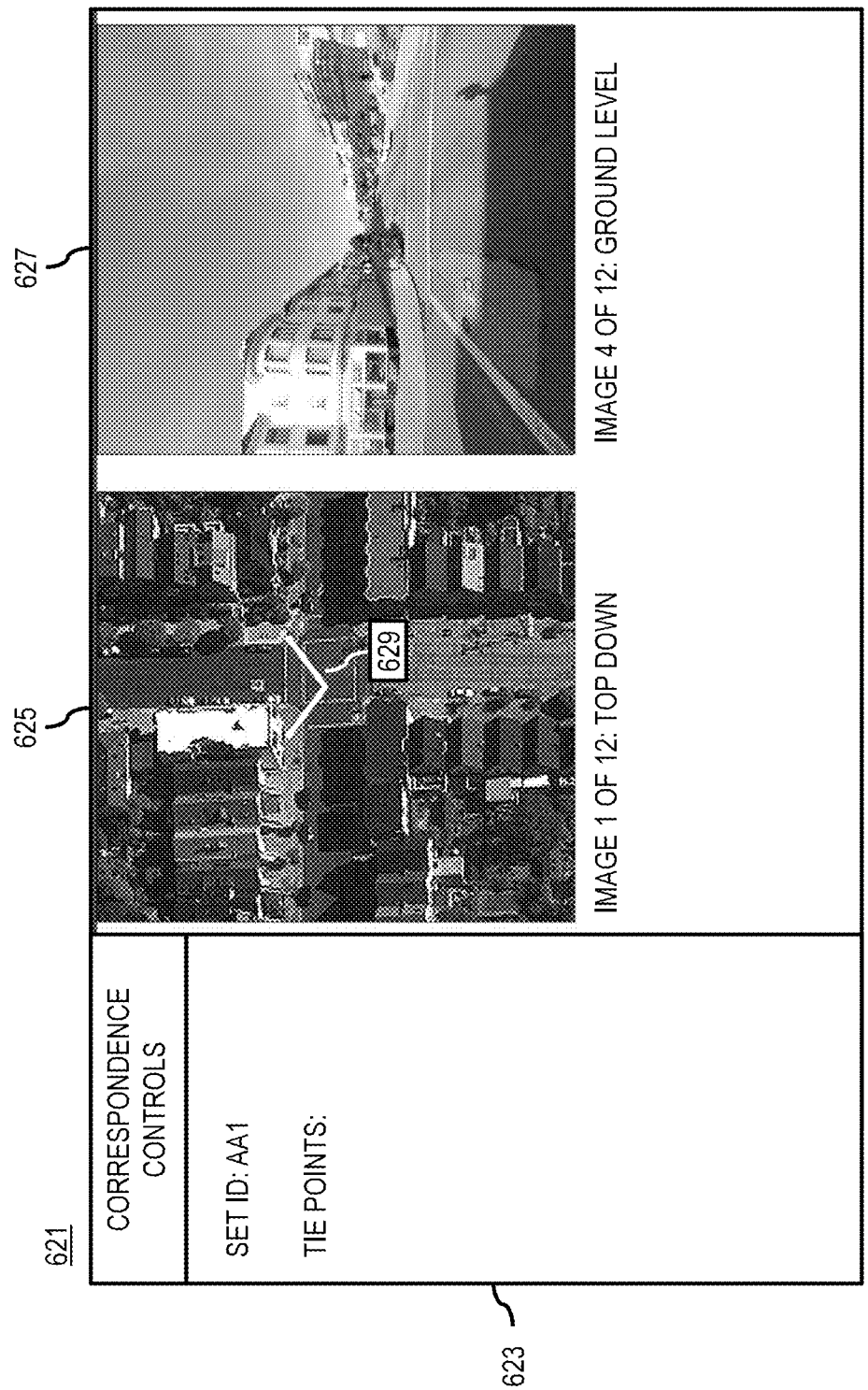

FIG. 6B illustrates another example user interface (UI) 621 based on labeling images for cross view alignment, according to one embodiment. In this example, the UI 621 has the following components: a sidebar 623 and two images depicting the same area (e.g., top down image 625 and ground level image 627) with some contextual information (e.g., image description and number) below the images 625 and 627. In one embodiment, the sidebar 623 provides additional contextual information as it relates to the entire image set, including but not limited to the range of tie points that have been drawn either of the images 625 or 627, and which image the point belongs to. In addition to these details, the sidebar 623 or equivalent can provide a range of ways to choose what type of annotation or labeling the user would like to mark up (e.g., tie points, skip polygons, etc.) as well as the ID of the image correspondence set.

The two images 625 and 627 come from different sources (e.g., top down source for top down image 625 and ground level source for ground level image 627). In one embodiment, meta data about the positional data of the ground level image 627 can be determined according to the embodiments of the described above and then rendered as an overlay on the top down image 625. For example, reference angles 629 are drawn or rendered on the top down image 625 to give the user perspective as to where the ground level image 627 is generally location and which direction it is pointing in. In other words, the overlay module 305 can generate representations of the camera pose data, trajectory data, etc. of the ground level image 627 as reference angles or other equivalent visual indicator.

Figure 6C:
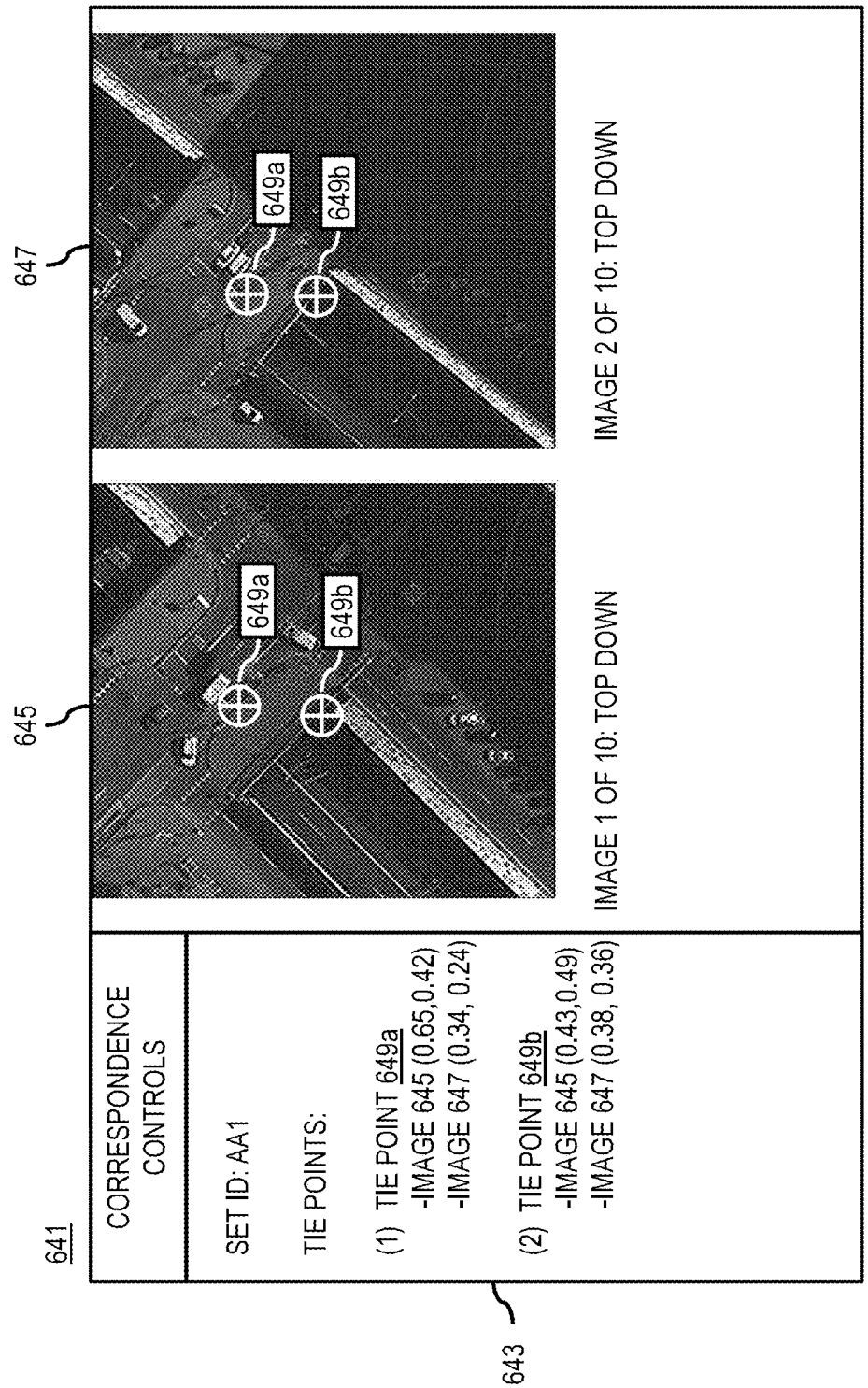

FIG. 6C illustrates an example UI 641 that is equivalent to the UI 621. In this example, the UI 641 presents a sidebar 643 with two top down images 645 and 647 from slightly different perspectives where the sidebar 643 indicates that a user has marked to tie points 649a and 649b visible in each of the images 645 and 647. The sidebar 643 presents the respective coordinates of the tie points 649a and 649b in each of the images 645 and 647. In one embodiment, based on the tie point coordinates, the overlay module 305 can generate meta data (e.g., marker locations) indicating the respective tie points in each of the two images 645 and 647. The overlay module 305 can then render one or more markers representing the tie points 649a and 649b in time images 645 and 647 as shown.

Figure 6D:
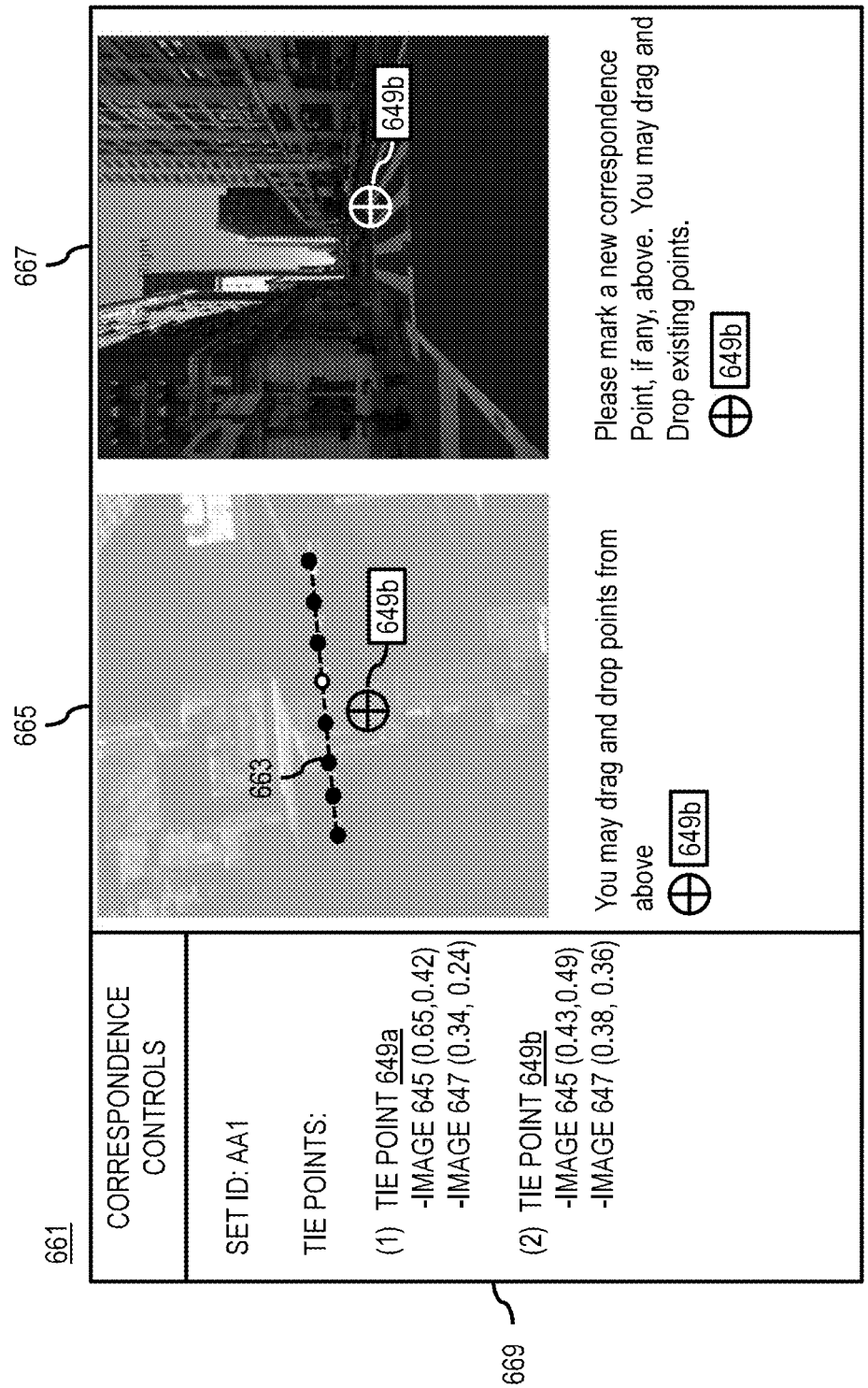

In another embodiment, as shown in FIG. 6D, the overlay module 305 can present a UI 661 that overlays a path of points 663 (e.g., representing a vehicle trajectory of the ground level image capture vehicle 101) on the top down image 665 where each respective ground level imagery is captured. This type of overlay 663 can be used when multiple ground images are being labeled, giving the user more information about the image correspondence set. For example, the feature labeling module 307 can determine when a user has selected a specific ground level image 665 from among multiple ground level images for feature labeling or correspondence. Then the feature labeling module 307 can interact with the overlay module 305 to dynamically initiate the presenting of the generated meta data (e.g., ground tracks 663 of the vehicle trajectory) on the top image 665 in the UI 661 based on which of the ground level images are selected (e.g., selected ground level image 667). In this example, the location point in the trajectory 663 corresponding to the selected ground level image 667 is highlighted in white. As other ground levels images are selected for labeling, the overlay module 305 can dynamically highlight the point on the trajectory 663 that corresponds to the location of the selected image.

In one embodiment, beneath each image 665 and 667 lies a marker for each tie point (e.g., tie point 649a) that has been dropped on the respective image 645 and/or 647, along with the point number and/or visual indicator (e.g., shade, color, etc.). The markers for each tie point 649a or 649b can be dragged and dropped between the sidebar 669 and any of the images 665 and 667 to indicate feature correspondence.

In one embodiment, the output (e.g., meta data labeled images for cross view alignment) of the embodiments can be used for any number applications including but not limited to location correction of different images sources (e.g., higher accuracy imagery or map feature locations can be transferred or used to correct the location data of lower accuracy imagery). In other words, the cross view alignment of images can be used to perform geometric correction of location data associated with a first image (e.g., ground level image), second image (e.g., top down image), or a combination thereof. Other applications can include but are not limited to higher accuracy map making, autonomous driving, and/or other location-based services. For example, autonomous driving has quickly become an area of intense interest where machine learning in combination with computer vision systems can be used. One application of vision techniques using feature correspondence determined from cross view alignment between different image views is localization of the vehicle 101 with respect to reference map features (e.g., reference locations with highly accurate known locations). This localization can used for instance to facilitate autonomous driving when the location accuracy is sufficiently high (e.g., submeter or better accuracy). In one embodiment, the system 100 (e.g., the mapping platform 111) can generate map features using cross view alignment for higher accuracy localization according to the embodiments as described herein. For example, the cross view alignment generated according to the embodiments described herein can be used to location-correct map features that can then be used as reference markers by vehicles 101 to localize themselves.

Traditionally, most vehicle navigation systems have accomplished this localization using GPS, which generally provides a real-time location with a 95% confidence interval of 7.8 meters. However, in complicated urban environments, reflection of GPS signals can further increase this error, such that one's location may be off by as much as 30 meters. Given that the width of many lanes is 3-4 meters, this accuracy is not sufficient to properly localize a vehicle 101 (e.g., an autonomous vehicle) so that it can make safe route planning decisions. Other sensors, such as inertial measurement units (IMUs) can increase the accuracy of localization by taking into account vehicle movement, but these sensors tend to drift and still do not provide sufficient accuracy for localization.

In general, a localization accuracy of around 10 cm is needed for safe driving (e.g., autonomous driving) in many areas. One way to achieve this level of accuracy is to use visual odometry, in which features are detected from imagery. These features can then be matched to a database of known feature locations to determine one's location. By way of example, traditional feature-based localization that both detect features and localize against them generally rely on low-level features. However, low-level features typically used in these algorithms (e.g., Scale-Invariant Feature Transform (SIFT) or Oriented FAST and rotated BRIEF (ORB)) tend to be brittle and not persist in different environmental and lighting conditions. As a result, they often cannot be used to localize a vehicle on different days in different weather conditions. Aside from reproducibility, the ability to detect and store higher level features of different types (e.g., map features based on intersection features such as lane markings, lane lines, etc.) can provide better and more accurate localization.

A vehicle 101, for instance, can use computer vision to identify a known map feature (e.g., a crosswalk corner), and then estimate its distance to the detected feature (e.g., location corrected according to the embodiments described herein). Because the location of the detected has been corrected to high accuracy using the feature correspondences generated according to the embodiments described herein, the vehicle 101 can compute its distance to the feature to use as a distance offset to the known location to localize itself with a corresponding high degree of accuracy. Understanding one's location on a map enables planning of a route, both on fine and coarse scales. On a coarse scale, navigation maps allow vehicles 101 to know what roads to use to reach a particular destination. However, on a finer scale, maps allow vehicles 101 to know what lanes to be in and when to make lane changes. Knowing this information is important for planning an efficient and safe route, for in complicated driving situations maneuvers need to be executed in a timely fashion, and sometimes before they are visually obvious. In addition, localization with respect to ground control points enables the incorporation of other real-time information into route planning. Such information could include traffic, areas with unsafe driving conditions (ice, fog, potholes, e.g.), and temporary road changes like construction.

Returning to FIG. 1, as shown, the system 100 includes the mapping platform 111 which incorporates the machine learning system 113 and computer vision system 115 configured to use machine learning to detect objects or features (e.g., intersection features) depicted in images that can be used as features or ground control points for generating feature correspondences from cross view alignment. For example, with respect to autonomous, navigation, mapping, and/or other similar applications, the computer vision system 115 can detect features in input images to provide location correction of sources based on feature correspondence, according to the various embodiments described herein. In one embodiment, the machine learning system 113 includes a neural network or other machine learning system to make predictions from machine learning models. For example, when the input to the machine learning model are images used for in the embodiments described herein, the output can include pixel locations of photo-identifiable features that can be used to determine feature correspondence between images for location correction or other applications. In one embodiment, the neural network of the machine learning system 113 is a traditional convolutional neural network which consists of multiple layers of collections of one or more neurons (which are configured to process a portion of an input image. In one embodiment, the receptive fields of these collections of neurons (e.g., a receptive layer) can be configured to correspond to the area of an input image delineated by a respective a grid cell generated as described above.

In one embodiment, the machine learning system 113 and/or the computer vision system 115 also have connectivity or access over a communication network 125 to a geographic database 107 which stores the imagery for different sources (e.g., with different views or perspectives), meta data for cross view alignment, extracted features, features correspondences, derived maps, etc. generated according to the embodiments described herein. In one embodiment, the geographic database 107 includes representations of features and/or other related geographic features determined from feature correspondences to facilitate visual odometry to increase localization accuracy. In one embodiment, the machine learning system 113 and/or computer vision system 115 have connectivity over a communication network 125 to the services platform 119 that provides one or more services 121. By way of example, the services 121 may be third party services and include mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services 121 uses the output of the mapping platform 111 (e.g., location corrected images, features, etc.) to localize the vehicle 101 or UE 103 (e.g., a portable navigation device, smartphone, portable computer, tablet, etc.) and/or provide services 121 such as navigation, mapping, other location-based services, etc.

In one embodiment, the mapping platform 111 may be a platform with multiple interconnected components. The mapping platform 111 may include multiple servers, intelligent networking devices, computing devices, components and corresponding software for providing parametric representations of lane lines. In addition, it is noted that the mapping platform 111 may be a separate entity of the system 100, a part of the one or more services 121, a part of the services platform 119, or included within the UE 103 and/or vehicle 101.

In one embodiment, content providers 127a-127m (collectively referred to as content providers 127) may provide content or data (e.g., including geographic data, parametric representations of mapped features, etc.) to the geographic database 107, the machine learning system 113, the computer vision system 115, the services platform 119, the services 121, the UE 103, the vehicle 101, and/or an application 123 executing on the UE 103. The content provided may be any type of content, such as map content, textual content, audio content, video content, image content, etc. In one embodiment, the content providers 127 may provide content that may aid in the detecting and classifying of lane lines and/or other features in image data and degerming feature correspondences. In one embodiment, the content providers 127 may also store content associated with the geographic database 107, mapping platform 111, machine learning system 113, computer vision system 115, services platform 119, services 121, UE 103, and/or vehicle 101. In another embodiment, the content providers 127 may manage access to a central repository of data, and offer a consistent, standard interface to data, such as a repository of the geographic database 107.

In one embodiment, the UE 103 and/or vehicle 101 may execute a software application 123 to capture image data or other observation data for providing image labeling for cross view alignment according the embodiments described herein. By way of example, the application 123 may also be any type of application that is executable on the UE 103 and/or vehicle 101, such as autonomous driving applications, mapping applications, location-based service applications, navigation applications, content provisioning services, camera/imaging application, media player applications, social networking applications, calendar applications, and the like. In one embodiment, the application 123 may act as a client for the mapping platform 111 and perform one or more functions associated with generating feature correspondence from different image views alone or in combination with the machine learning system 113.

By way of example, the UE 103 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 103 can support any type of interface to the user (such as "wearable" circuitry, etc.). In one embodiment, the UE 103 may be associated with the vehicle 101 or be a component part of the vehicle 101.

In one embodiment, the UE 103 and/or vehicle 101 are configured with various sensors for generating or collecting environmental image data (e.g., for processing by the mapping platform 111), related geographic data, etc. In one embodiment, the sensed data represent sensor data associated with a geographic location or coordinates at which the sensor data was collected. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture ground control point imagery, etc. for analysis), an audio recorder for gathering audio data, velocity sensors mounted on steering wheels of the vehicles, switch sensors for determining whether one or more vehicle switches are engaged, and the like.

Other examples of sensors of the UE 103 and/or vehicle 101 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the UE 103 and/or vehicle 101 may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the UE 103 and/or vehicle 101 may include GPS or other satellite-based receivers to obtain geographic coordinates from satellites for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 125 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the mapping platform 111, machine learning system 113, computer vision system 115, services platform 119, services 121, UE 103, vehicle 101, and/or content providers 127 communicate with each other and other components of the system 100 using well known, new or still developing protocols. In this context, a protocol includes a set of rules defining how the network nodes within the communication network 125 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 7:
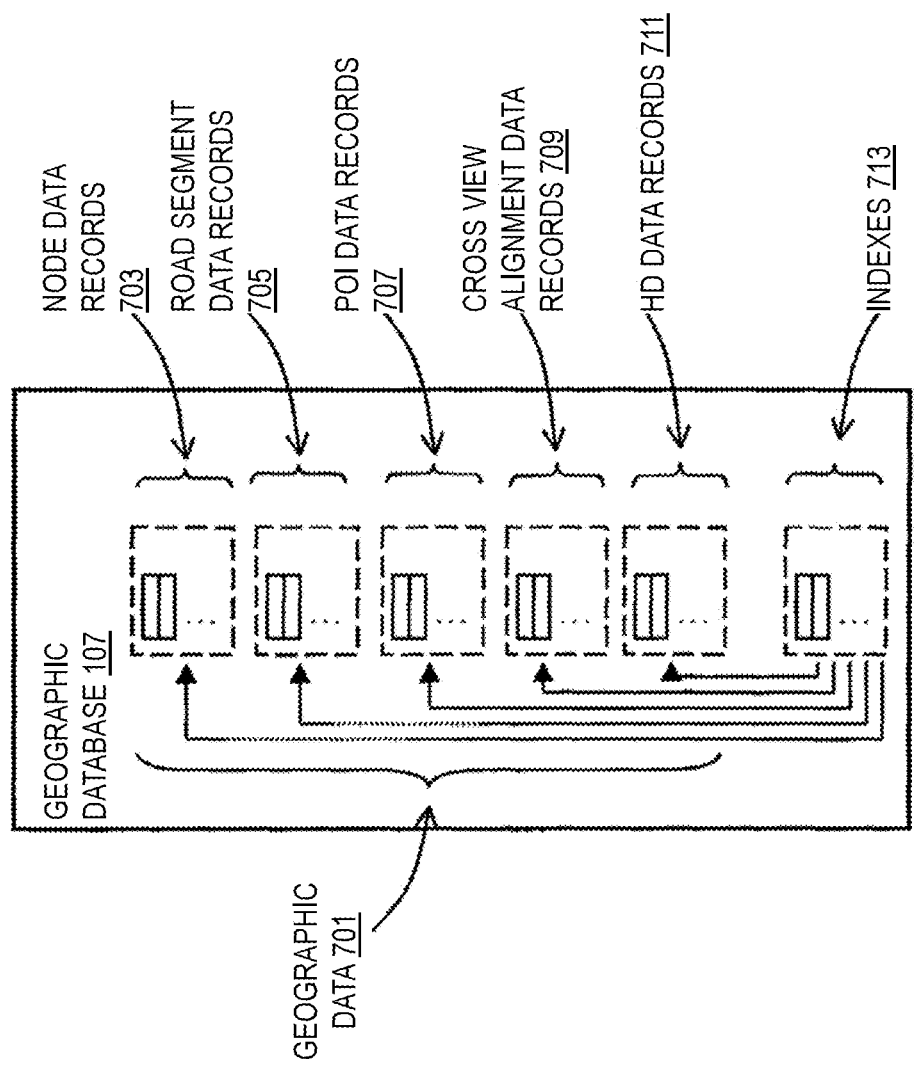
FIG. 7 is a diagram of a geographic database, according to one embodiment.

FIG. 7 is a diagram of a geographic database, according to one embodiment. In one embodiment, the geographic database 107 includes geographic data 701 used for (or configured to be compiled to be used for) mapping and/or navigation-related services, such as for video odometry based on the mapped features (e.g., lane lines, road markings, signs, etc.). In one embodiment, the geographic database 107 includes high resolution or high definition (HD) mapping data that provide centimeter-level or better accuracy of map features. For example, the geographic database 107 can be based on Light Detection and Ranging (LiDAR) or equivalent technology to collect billions of 3D points and model road surfaces and other map features down to the number lanes and their widths. In one embodiment, the HD mapping data (e.g., HD data records 711) capture and store details such as the slope and curvature of the road, lane markings, roadside objects such as sign posts, including what the signage denotes. By way of example, the HD mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 107.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island).

In one embodiment, a polygon is constructed from one outer simple polygon and none or at least one inner simple polygon. A polygon is simple if it just consists of one simple polygon, or complex if it has at least one inner simple polygon.

In one embodiment, the geographic database 107 follows certain conventions. For example, links do not cross themselves and do not cross each other except at a node. Also, there are no duplicated shape points, nodes, or links. Two links that connect each other have a common node. In the geographic database 107, overlapping geographic features are represented by overlapping polygons. When polygons overlap, the boundary of one polygon crosses the boundary of the other polygon. In the geographic database 107, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 107 includes node data records 703, road segment or link data records 705, POI data records 707, cross view alignment data records 709, HD mapping data records 711, and indexes 713, for example. More, fewer or different data records can be provided. In one embodiment, additional data records (not shown) can include cartographic ("carto") data records, routing data, and maneuver data. In one embodiment, the indexes 713 may improve the speed of data retrieval operations in the geographic database 107. In one embodiment, the indexes 713 may be used to quickly locate data without having to search every row in the geographic database 107 every time it is accessed. For example, in one embodiment, the indexes 713 can be a spatial index of the polygon points associated with stored feature polygons.

In exemplary embodiments, the road segment data records 705 are links or segments representing roads, streets, or paths, as can be used in the calculated route or recorded route information for determination of one or more personalized routes. The node data records 703 are end points corresponding to the respective links or segments of the road segment data records 705. The road link data records 705 and the node data records 703 represent a road network, such as used by vehicles, cars, and/or other entities. Alternatively, the geographic database 107 can contain path segment and node data records or other data that represent pedestrian paths or areas in addition to or instead of the vehicle road record data, for example.

The road/link segments and nodes can be associated with attributes, such as functional class, a road elevation, a speed category, a presence or absence of road features, geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 107 can include data about the POIs and their respective locations in the POI data records 707. The geographic database 107 can also include data about places, such as cities, towns, or other communities, and other geographic features, such as bodies of water, mountain ranges, etc. Such place or feature data can be part of the POI data records 707 or can be associated with POIs or POI data records 707 (such as a data point used for displaying or representing a position of a city).

In one embodiment, the geographic database 107 can also include cross view alignment data records 709 for storing the meta data to indicating relative spatial relationships between images of different perspective views, identified feature correspondences (e.g., image-to-image correspondences, image-to-ground correspondences, etc.), location corrected images, location corrected features, location corrected camera models/poses, as well as other related data used or generated according to the various embodiments described herein. By way of example, the cross view alignment data records 709 can be associated with one or more of the node records 703, road segment records 705, and/or POI data records 707 to support localization or visual odometry based on the features stored therein and the corresponding estimated quality of the features. In this way, the records 709 can also be associated with or used to classify the characteristics or metadata of the corresponding records 703, 705, and/or 707.

In one embodiment, as discussed above, the HD mapping data records 711 model road surfaces and other map features to centimeter-level or better accuracy. The HD mapping data records 711 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 711 are divided into spatial partitions of varying sizes to provide HD mapping data to vehicles 101 and other end user devices with near real-time speed without overloading the available resources of the vehicles 101 and/or devices (e.g., computational, memory, bandwidth, etc. resources).

In one embodiment, the HD mapping data records 711 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 711.

In one embodiment, the HD mapping data records 711 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 107 can be maintained by the content provider 127 in association with the services platform 119 (e.g., a map developer). The map developer can collect geographic data to generate and enhance the geographic database 107. There can be different ways used by the map developer to collect data. These ways can include obtaining data from other sources, such as municipalities or respective geographic authorities. In addition, the map developer can employ field personnel to travel by vehicle (e.g., vehicle 101 and/or UE 103) along roads throughout the geographic region to observe features and/or record information about them, for example. Also, remote sensing, such as aerial or satellite photography, can be used.

The geographic database 107 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101 or UE 103, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing image labeling for cross view alignment may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
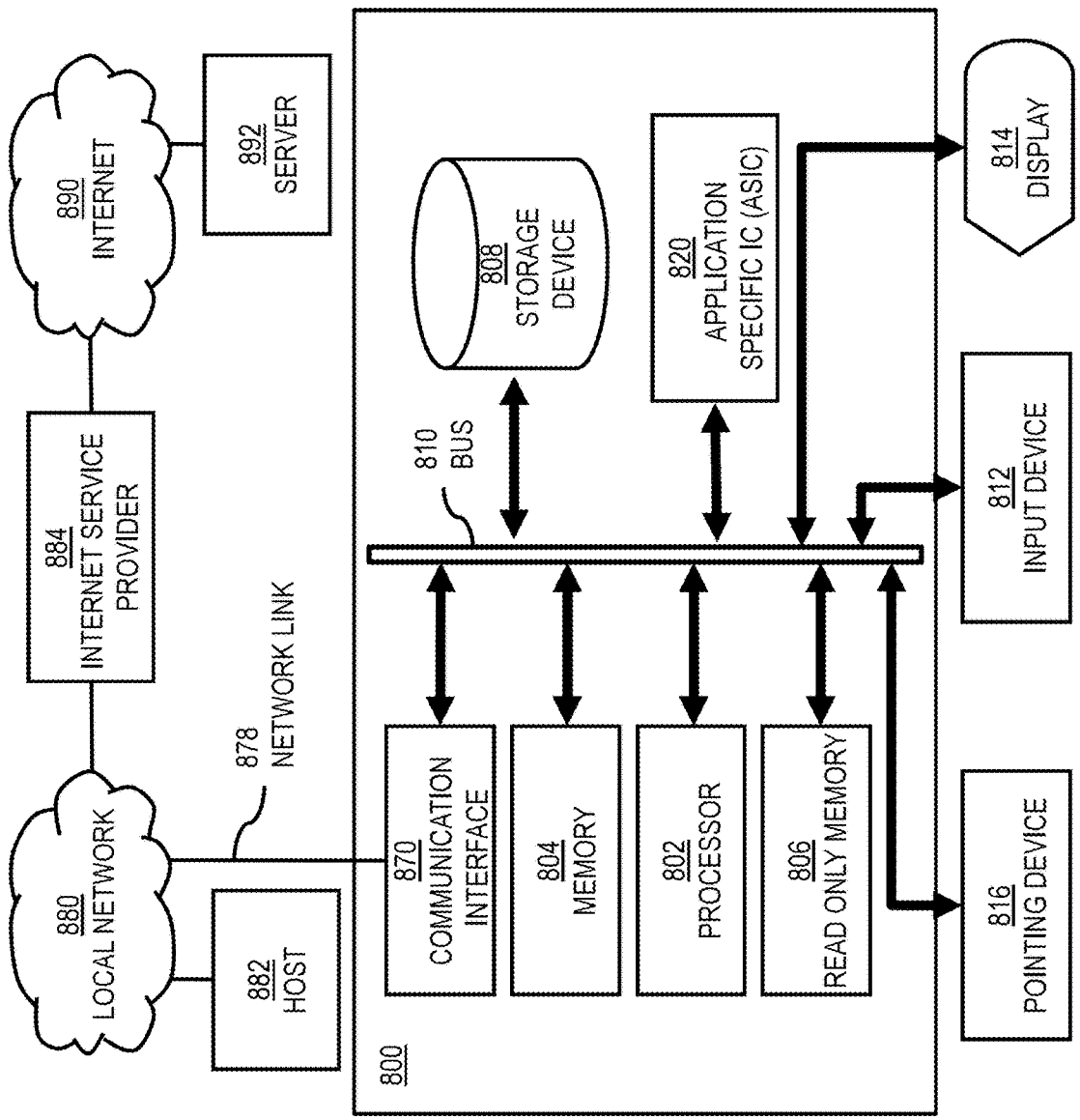
FIG. 8 is a diagram of hardware that can be used to implement an embodiment.

FIG. 8 illustrates a computer system 800 upon which an embodiment of the invention may be implemented. Computer system 800 is programmed (e.g., via computer program code or instructions) to provide image labeling for cross view alignment as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 810 includes one or more parallel conductors of information so that information is transferred quickly among devices coupled to the bus 810. One or more processors 802 for processing information are coupled with the bus 810.

A processor 802 performs a set of operations on information as specified by computer program code related to provide image labeling for cross view alignment. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions for providing image labeling for cross view alignment. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing image labeling for cross view alignment, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 125 for providing image labeling for cross view alignment.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 9 illustrates a chip set 900 upon which an embodiment of the invention may be implemented. Chip set 900 is programmed to provide image labeling for cross view alignment as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide image labeling for cross view alignment. The memory 905 also stores the data associated with or generated by the execution of the inventive steps.

Figure 10:
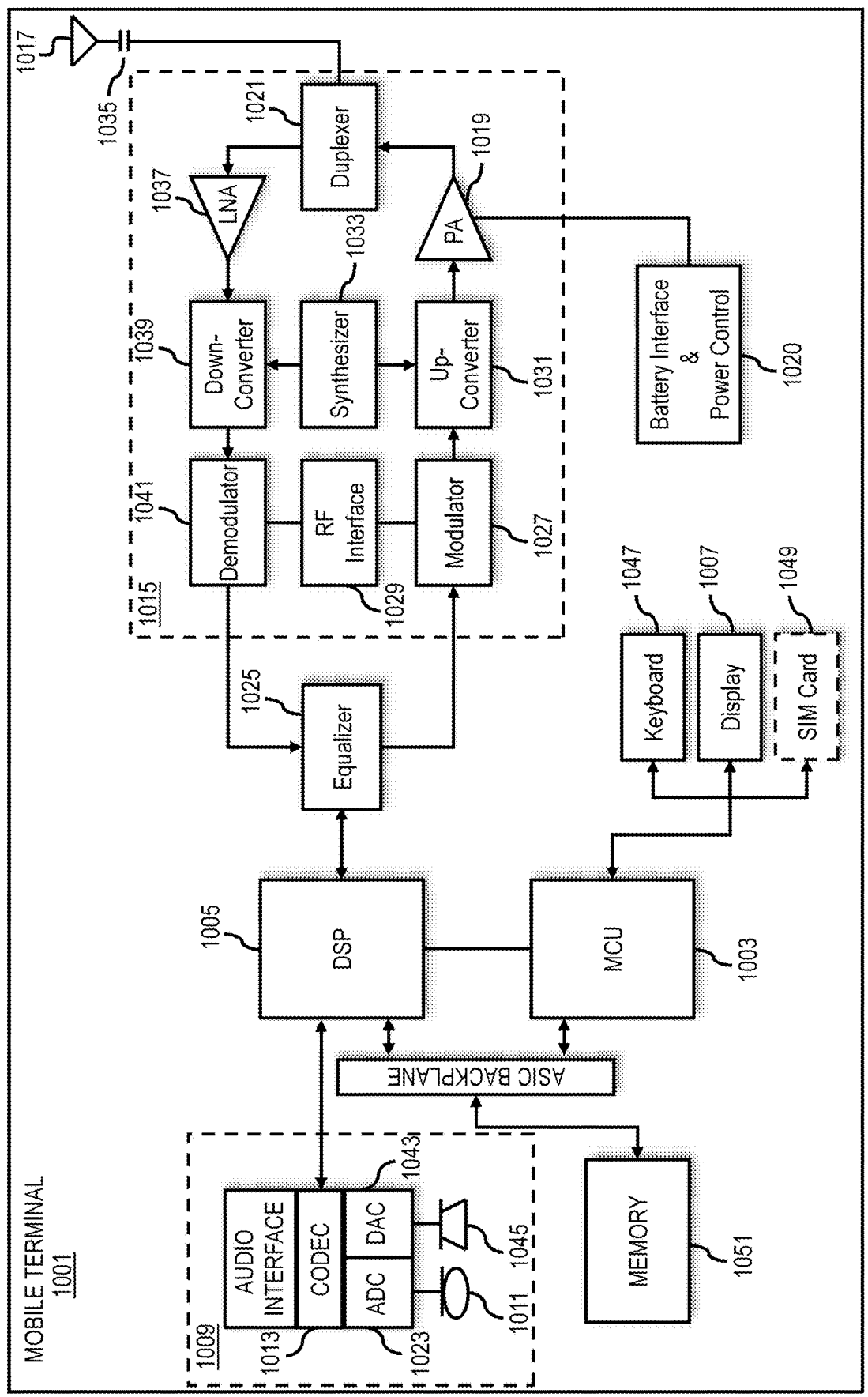
FIG. 10 is a diagram of a mobile terminal (e.g., handset, vehicle, or component thereof) that can be used to implement an embodiment.

FIG. 10 is a diagram of exemplary components of a mobile terminal (e.g., vehicle 101, UE 103, or component thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile station functions that offer automatic contact matching. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile station 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile station 1001 to provide image labeling for cross view alignment. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the station. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile station 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1051 may be, but not limited to, a single memory, CD, DVD, ROM, RAM, EEPROM, optical storage, or any other non-volatile or non-transitory storage medium capable of storing digital data.

An optionally incorporated SIM card 1049 carries, for instance, important information, such as the cellular phone number, the carrier supplying service, subscription details, and security information. The SIM card 1049 serves primarily to identify the mobile station 1001 on a radio network. The card 1049 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for labeling images for cross view alignment comprising:
    determining camera trajectory data for a plurality of first captured images depicting an area from a first perspective view, wherein the camera trajectory data specifies a path that a camera has traveled along a ground;
    processing the camera trajectory data to generate meta data indicating a position and an orientation of the first perspective view of the area relative spatially to a second perspective view of a plurality of second captured images that depict the area;
    providing the meta data as an overlay on the plurality of second captured images presented in a user interface, wherein the overlay represents respective locations, respective camera poses, and the camera trajectory data corresponding to the plurality of first captured images;
    translating pixel coordinates of the plurality of first and second captured images to real-world geo-coordinates so that the top and ground level perspectives of the plurality of first and second captured images can be determined relative to each other; and
    receiving a user interaction input at the user interface for labeling common features between the plurality of first captured images in a ground level perspective and the plurality of second captured images in a top down perspective for the cross view alignment of the plurality of first captured images in the ground level perspective and the plurality of second captured images in the top down perspective
    wherein the labeling comprises tying same location points in the plurality of first captured images in the ground level perspective and the plurality of second captured images in the top down perspective.

2. The method of claim 1, wherein the plurality of first images are ground level images collected from a ground-based camera sensor, and wherein the plurality of second images are a top down images collected from an aerial-based camera sensor.

3. The method of claim 1, wherein the meta data includes data for generating a representation of the camera trajectory data.

4. The method of claim 3, wherein the representation includes reference angles drawn to indicate vehicle tracks drawn to represent the camera trajectory data.

5. The method of claim 1, further comprising:
    receiving an input that selects the plurality of first images for labeling;
    dynamically initiating the presenting of the meta data in the user interface based on the input; and
    presenting concurrently the first perspective view and the second perspective view in the user interface.

6. The method of claim 1, wherein the plurality of first images are part of a plurality of images depicting the area from the first perspective, the method further comprising:
    rendering respective camera trajectories of the plurality of images in the overlay on the second perspective view of the second image.

7. The method of claim 6, further comprising:
    rendering one or more markers respectively designated by a user in said each of the plurality of images in the user interface.

8. The method of claim 1, wherein the user interface is presented to a user to annotate the plurality of first images and the plurality of second images to create a training data set for a machine learning model to perform automated cross view alignment of images.

9. The method of claim 1, wherein the cross view alignment of images is used to perform geometric correction of location data associated with the plurality of first images, the plurality of second images, or a combination thereof.

10. The method of claim 1, wherein the camera trajectory data is collected as a time-ordered sequence of location points sensed by one or more sensors, and wherein the location points include latitude, longitude, and elevation.

11. The method of claim 1, further comprising:
    dynamically highlighting a location point in the camera trajectory data in the plurality of second captured images, wherein the location point corresponds to the area relative spatially to the plurality of first captured images.

12. The method of claim 1, wherein the same location points comprise photo identifiable features and/or ground control points.

13. An apparatus for labeling images for cross view alignment comprising:
- at least one processor; and
- at least one memory including computer program code for one or more programs,
- the at least one memory and the computer program code configured to, with the at least one processor, cause the apparatus to perform at least the following,
- determining camera trajectory data for a plurality of first captured images depicting an area from a first perspective view, wherein the camera trajectory data specifies a path that a camera has traveled along a ground;
- processing the camera trajectory data to generate meta data indicating a position and an orientation of the first perspective view of the area relative spatially to a second perspective view of a plurality of second captured images that depict the area;
- providing the meta data as an overlay on the plurality of second captured images presented in a user interface, wherein the overlay represents respective locations, respective camera poses, and the camera trajectory data corresponding to the plurality of first captured images;
- translating pixel coordinates of the plurality of first and second captured images to real-world geo-coordinates so that the top and around level perspectives of the plurality of first and second captured images can be determined relative to each other; and
- receiving a user interaction input at the user interface for labeling common features between the plurality of first captured images in a ground level perspective and the plurality of second captured images in a top down perspective for the cross view alignment of the plurality of first captured images in the ground level perspective and the plurality of second captured images in the top down perspective,
- wherein the labeling comprises tying same location points in the plurality of first captured images in the ground level perspective and the plurality of second captured images in the top down perspective.

14. The apparatus of claim 13, wherein the plurality of first captured images are ground level images collected from a ground-based camera sensor, and wherein the plurality of second captured images are a top down images collected from an aerial-based camera sensor.

15. The apparatus of claim 13, wherein the meta data includes data for generating a representation of the camera trajectory data.

16. The apparatus of claim 15, wherein the representation includes reference angles drawn to indicate vehicle tracks drawn to represent the camera trajectory data.

17. A non-transitory computer-readable storage medium for labeling images for cross view alignment, carrying one or more sequences of one or more instructions which, when executed by one or more processors, cause an apparatus to perform:
- determining camera trajectory data for a plurality of first captured images depicting an area from a first perspective view, wherein the camera trajectory data specifies a path that a camera has traveled along a ground;
- processing the camera trajectory data to generate meta data indicating a position and an orientation of the first perspective view of the area relative spatially to a second perspective view of a plurality of second captured images that depict the area;
- providing the meta data as an overlay on the plurality of second captured images presented in a user interface, wherein the overlay represents respective locations, respective camera poses, and the camera trajectory data the plurality of first captured images;
- translating pixel coordinates of the plurality of first and second captured images to real-world geo-coordinates so that the top and around level perspectives of the plurality of first and second captured images can be determined relative to each other; and
- receiving a user interaction input at the user interface for labeling common features between the plurality of first captured images in a ground level perspective and the plurality of second captured images in a top down perspective for the cross view alignment of the plurality of first captured images in the ground level perspective and the plurality of second captured images in the top down perspective,
- wherein the labeling comprises tying same location points in the plurality of first captured images in the ground level perspective and the plurality of second captured images in the top down perspective.

18. The non-transitory computer-readable storage medium of claim 17, wherein the plurality of first captured images are ground level images collected from a ground-based camera sensor, and wherein the plurality of second captured images is a top down image collected from an aerial-based camera sensor.

19. The non-transitory computer-readable storage medium of claim 17, wherein the meta data includes data for generating a representation of the camera trajectory data.

20. The non-transitory computer-readable storage medium of claim 19, wherein the representation includes reference angles drawn to indicate vehicle tracks drawn to represent the camera trajectory data.

* * * * *